Patented June 27, 1950

2,512,634

UNITED STATES PATENT OFFICE 2,512,634

CONDENSATION OF LINEAR 1,2,4 TRIAZOLE WITH ALDEHYDE, DIISOCYANATE, OR DI-URETHANE

James Wotherspoon Fisher, Edward William Wheatley, and Harold Bates, Spondon, near Derby, England, assignors to Celanese Corporation of America, a corporation of Delaware No Drawing. Application August 15, 1949, Serial No. 110,458. In Great Britain August 31, 1948

5 Claims. (Cl. 260—72)

This invention relates to improvements in the treatment of polymeric substances.

U. S. application S. No. 726,964 filed February 6, 1947 describes the production of co-polymers by reacting a linear polymer containing the 1,2,4-triazole nucleus, and particularly the 4-amino-1,2,4-triazole nucleus, of the type made according to U. S. application S. Nos. 662,628 filed April 16, 1946 and 609,031 filed August 4, 1945, with a bifunctional amide-forming substance containing a functional group complementary to a terminal group of said polymer. For the purpose of producing fibre- or film-forming polymers, the best form of carrying out the manufacture according to U. S. application S. No. 726,964 is to heat a polymer, as formed by heating a dicarboxylic acid dihydrazide with free hydrazine, with a diamine-stabilised polyamide or with the ingredients necessary to yield a diamine-stabilized polyamide, or with a diamine.

U. S. application S. No. 89,806 filed April 26, 1949 describes the production of co-polymers which are similar in character by heating together a mixture comprising hydrazine, a dicarboxylic acid and another bifunctional amide-forming component or substances which yield such a mixture on hydrolysis, the components being proportioned so that the sum of the amino groups and hydrazine groups present exceeds the number of carboxylic groups present and the number of amino groups does not substantially exceed the number of carboxylic groups. Again the most important polymers of this specification are produced by heating a diamine-stabilised polyamide (including a comparatively simple compound containing two residues of a diamine and one residue of a dicarboxylic acid) with a dicarboxylic acid dihydrazide.

Generally the polymers of U. S. applications S. Nos. 726,964 and 89,806 are linear polymers containing both triazole links and amide links.

According to the present invention, such polymers, and particularly those produced by condensing a polyaminotriazole with a diamine-stabilised polyamide or with the ingredients therefor, are aftertreated wth an aldehyde, and particularly formaldehyde, or with a di- or poly-isocyanate or an equivalent di- or poly-urethane, or with substances yielding such reagents. Generally the effect of such an aftertreatment is to raise substantially the melting point of the polymer, and more especially to raise the ironing point of textiles made from such a polymer.

We prefer to spin filaments or fibres from the polymers by a melt spinning process and to treat the yarn so obtained, or a fabric containing it, with the aftertreating agent. Formaldehyde generally produces an effect in the cold, but the aftertreatment is best completed by baking the material containing the polymer and impregnated with the formaldehyde. Similarly, in the case of aftertreating with di- or poly-isocyanates or urethanes, the treatment may be carried out by heating the textile material containing the polymer with a solution of the isocyanate or urethane in an inert solvent, for example xylene, until the desired properties, and particularly increase in melting point and ironing temperature, are obtained. Alternatively the polymer or textile containing it may be impregnated with the di- or poly-isocyanate or urethane by application from an inert solvent, the inert solvent evaporated and the product given a short baking treatment to complete the reaction between the aftertreating agent and the polymer.

Formaldehyde may be applied from an aqueous bath or may be applied in vapour form, generated, for example, from paraformaldehyde or trioxane, or the material may be impregnated with the substance yielding the formaldehyde and then treated under such conditions as to regenerate the formaldehyde.

The following example illustrates the invention:

Example

A polymer is made according to the following recipe: A mixture of 100 molecular proportions of hexamethylene diammonium adipate and 10.5 molecular proportions of hexamethylene diamine is heated under nitrogen for 6 hours at 200–210° C. in an amount of meta-cresol equal to the combined weight of the reactants. The solution obtained is precipitated by pouring into excess acetone. The product (Intermediate A) is found to be a powdery solid with no fibre-forming properties, and has a melting point of 240° C., an intrinsic viscosity of 0.27 and a nitrogen content of 12.3%.

A polyamino triazole is prepared by heating 150 parts by weight of adipic dihydrazide and 30 parts by weight of 50% aqueous hydrazine hydrate in an autoclave for 1 hour at 200° C., the maximum pressure being 220 lbs. per square inch. The product is a sticky white mass which is washed with cold water and dried to yield a white powder (Intermediate B), melting point 215–220° C., intrinsic viscosity about 0.10 and nitrogen content about 34.8%. It has no fibre-forming properties.

60 parts by weight of Intermediate A and 40 parts by weight of Intermediate B are heated under nitrogen for 6 hours at 200–210° C. in an amount of meta-cresol equal to the combined weight of the reactants. The mixture is poured into excess of acetone, which precipitates the polymer as a semi-fibrous mass. It has a melting point of 220–225° C., intrinsic viscosity about 0.45, nitrogen content about 19.5% and good fibre-forming properties. It is insoluble in water and acetone, very slightly soluble in methanol, and soluble in cresol and formic acid.

The polymer is melt spun into a yarn and a hank of the yarn, with or without cold drawing, is immersed for 16 hours at room temperature in 40% aqueous formaldehyde solution containing 0.5% of ammonium chloride as catalyst, the volume ratio of the bath being approximately 100:1. The yarn is then removed, squeezed to remove excess liquor, and dried at 100° C. It is then baked at 140° C. for 5–15 minutes to complete the treatment. By this means the ironing temperature is raised by some 40 to 60° C.

In a similar way the yarn may be impregnated with 10–20% of its weight of a di-isocyanate, for example hexamethylene, heptamethylene or octamethylene di-isocyanate, in the form of a 10% solution in dry benzene, the benzene removed in a stream of air and the hank baked as described above for the formaldehyde treatment.

Again the yarn may be immersed in an 8–12% solution of a di-isocyanate in xylene and the whole raised to the boil under reflux and reflux continued for 10–15 minutes. The yarn may then be removed, washed with benzene or other inert solvent and dried in a current of air. By this means the yarn is rendered infusible and insoluble.

Other aldehydes may be used instead of formaldehyde, for example acetaldehyde, glyoxal or benzaldehyde, but generally formaldehyde is preferred. As isocyanates there may be used polymethylene di-isocyanates such as ethylene di-isocyanate, trimethylene, pentamethylene, hexamethylene, heptamethylene and octamethylene di-isocyanates, or metatoluylene di-isocyanate, or the corresponding urethanes may be used, for example the urethanes obtained by reacting the above di-isocyanates with phenol.

Generally the treatment may be applied to the polymers not only in the form of textiles but in the form of bristles, films or with the polymer in the mass form. One effect of the treatment is to render the polymer insoluble in the usual solvents, such as formic acid and meta-cresol or other phenolic substances. If the treatment is sufficiently vigorous, a certain amount of rigidity is imparted to the treated material, which may be advantageous in the case of bristles. With textiles, the conditions of treatment or the quantities of aftertreating agent applied are preferably moderated so as to produce little, if any, effect on the flexibility of the material treated.

Having described our invention, what we desire to secure by Letters Patent is:

1. Process for the treatment of linear, fibre-forming co-polymers containing both 1.2.4-triazole links and carboxylicamide links in the linear chain, which comprises reacting said co-polymers with a member of the group consisting of aldehydes free from reactive groups other than the aldehyde groups, diisocyanates free from reactive groups other than the isocyanate groups and diurethanes free from reactive groups other than the urethane groups.

2. Process for the treatment of linear, fibre-forming co-polymers containing both 4-amino-1.2.4-triazole links and carboxylic-amide links in the linear chain, which comprises reacting said co-polymers with a member of the group consisting of aldehydes free from reactive groups other than the aldehyde groups, diisocyanates free from reactive groups other than the isocyanate groups and diurethanes free from reactive groups other than the urethane groups.

3. Process for the treatment of linear, fibre-forming co-polymers obtained by condensing a linear polymer having 4-amino-1.2.4-triazole rings in its structural unit with a linear polycarboxylamide containing two terminal amino groups, there being at least one hydrogen atom attached to the nitrogen of each terminal amino group, which comprises reacting said co-polymers with a member of the group consisting of aldehydes free from reactive groups other than the aldehyde groups, diisocyanates free from reactive groups other than the isocyanate groups and diurethanes free from reactive groups other than the urethane groups.

4. Process for the treatment of linear, fibre-forming co-polymers obtained by condensing a linear polymer having 4-amino-1.2.4-triazole rings in its structural unit with a linear polycarboxylamide containing two terminal amino groups, there being at least one hydrogen atom attached to the nitrogen of each terminal amino group, which comprises reacting said co-polymers with formaldehyde.

5. Process for the treatment of filaments made of linear, fibre-forming co-polymers containing both 4-amino-1.2.4-triazole links and carboxylicamide links in the linear chain, which comprises reacting said co-polymers with a member of the group consisting of aldehydes free from reactive groups other than the aldehyde groups, diisocyanates free from reactive groups other than the isocyanate groups and diurethanes free from reactive groups other and the urethane groups.

JAMES WOTHERSPOON FISHER.
EDWARD WILLIAM WHEATLEY.
HAROLD BATES.

REFERENCES CITED

The following references are of record in the file of this patent:

UNITED STATES PATENTS

| Number | Name | Date |
|---|---|---|
| 2,288,279 | Hopff | June 30, 1942 |
| 2,332,302 | D'Alelio | Oct. 19, 1943 |
| 2,476,968 | Fisher | July 26, 1949 |